(12) United States Patent
Huebner et al.

(10) Patent No.: US 9,862,325 B2
(45) Date of Patent: Jan. 9, 2018

(54) CARGO MANAGEMENT SYSTEM INCORPORATING S-SHAPED CHANNELS

(71) Applicant: FORD GLOBAL TECHNOLOGIES, LLC, Dearborn, MI (US)

(72) Inventors: Annette Lynn Huebner, White Lake, MI (US); Artur Sakarian, Birmingham, MI (US); Ryan Welch, Ottawa Lake, MI (US); Kristin Ann Hellman, Walled Lake, MI (US); Matthew B Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/816,575

(22) Filed: Aug. 3, 2015

(65) Prior Publication Data
US 2017/0036609 A1    Feb. 9, 2017

(51) Int. Cl.
*B60R 5/04* (2006.01)
*B60R 7/02* (2006.01)

(52) U.S. Cl.
CPC .............. *B60R 5/045* (2013.01); *B60R 7/02* (2013.01)

(58) Field of Classification Search
CPC ................................ B60R 5/045; B60R 5/048
USPC ........ 296/24.43, 24.44, 37.16, 37.6; 224/542
See application file for complete search history.

(56) References Cited

U.S. PATENT DOCUMENTS

| 3,929,371 | A | * | 12/1975 | Gibson | ................... B60P 7/135 108/109 |
| 4,749,226 | A |   | 6/1988 | Heft |   |
| 4,932,704 | A |   | 6/1990 | Ament |   |
| 5,037,154 | A | * | 8/1991 | Senba | ..................... B60R 5/044 296/37.1 |
| 6,186,575 | B1 |   | 2/2001 | Fisher et al. |   |
| 6,908,139 | B1 |   | 6/2005 | Szieff |   |
| 7,537,257 | B2 | * | 5/2009 | Watanabe | ................. B60R 7/04 296/24.46 |
| 9,132,778 | B2 | * | 9/2015 | Yoshizawa | ............ B60R 13/013 |
| 2003/0222475 | A1 | * | 12/2003 | Nakamitsu | .............. B60R 5/045 296/37.16 |
| 2006/0016840 | A1 | * | 1/2006 | Svenson | ................. B60R 5/045 224/42.32 |

(Continued)

FOREIGN PATENT DOCUMENTS

| EP | 1247693 B1 | 10/2005 |
| EP | 1728684 A1 * | 12/2006 |

(Continued)

OTHER PUBLICATIONS

English machine translation for EP1247693B1.

*Primary Examiner* — Jason S Morrow
(74) *Attorney, Agent, or Firm* — Vichit Chea; King & Schickli, PLLC

(57) ABSTRACT

A cargo management system is provided for a cargo area of a motor vehicle. The cargo management system includes a first mounting element on a first side wall of the cargo area and a second mounting element on a second side wall of the cargo area. Further, the cargo management system includes a partition. The partition includes a plurality of retractable mounting pins displaceable between a retracted position for removing the partition from the first and second mounting elements and an extended position for engaging the partition with the first and second mounting elements.

15 Claims, 13 Drawing Sheets

(56) References Cited

U.S. PATENT DOCUMENTS

| | | |
|---|---|---|
| 2006/0102671 A1 | 5/2006 | Fitzpatrick |
| 2006/0180623 A1 | 8/2006 | Reynolds et al. |
| 2010/0127529 A1 | 5/2010 | Elliott et al. |
| 2016/0039474 A1* | 2/2016 | Murray .................... B60R 5/04 296/24.33 |

FOREIGN PATENT DOCUMENTS

| | | |
|---|---|---|
| WO | WO-02/02371 A1 * | 1/2002 |
| WO | WO-2009/033567 A1 * | 3/2009 |

* cited by examiner

CARGO MANAGEMENT SYSTEM INCORPORATING S-SHAPED CHANNELS

TECHNICAL FIELD

This document relates generally to the motor vehicle equipment field and, more particularly, to a cargo management system for a cargo area of a motor vehicle.

BACKGROUND

A need exists for a user-friendly cargo management system for a cargo area of a motor vehicle such as behind the rearmost seat in a sport utility vehicle (SUV). That cargo management system must be user-friendly as well as relatively simple and inexpensive to produce. That cargo management system must also provide enhanced functionality by being readily positionable in multiple configurations to better meet user applications and hold or protect cargo from rolling around, rattling and becoming damaged during vehicle operation. This document relates to just such a cargo management system.

SUMMARY

In accordance with the purposes and benefits described herein, a cargo management system is provided for a cargo area of a motor vehicle. That cargo management system comprises a first mounting element on a first side wall of the cargo area, a second mounting element on a second side wall of the cargo area and a partition. The partition includes a plurality of retractable mounting pins displaceable between a retracted position for removing the partition from the first mounting element and the second mounting element and an extended position for engaging the partition with the first mounting element and the second mounting element.

In one possible embodiment, the first mounting element includes a first section, a second section and a third section. The second section is positioned vertically above the first section while the third section is positioned vertically above the second section. Further, the second mounting element includes a fourth section, a fifth section and a sixth section. The fifth section is positioned vertically above the fourth section and the sixth section is positioned vertically above the fifth section. Still further, the first section is aligned with the fourth section, the second section is aligned with the fifth section, and the third section is aligned with the sixth section.

A first curve connects the first section with the second section. A second curve connects the second section with the third section. A third curve connects the fourth section with the fifth section and a fourth curve connects the fifth section with the sixth section. In one possible embodiment, the first curve and the third curve are open in a vehicle rearward direction and the second curve and the fourth curve are open in a vehicle forward direction.

Still further, in one possible embodiment, the first section, the second section, the third section, the first curve and the second curve form a continuous first mounting element having a first end adjacent a floor and a tailgate opening of the motor vehicle and a second end adjacent a rear seat and a beltline of the motor vehicle. Further, the fourth section, the fifth section, the sixth section, the third curve and the fourth curve form a continuous second mounting element having a third end adjacent the floor and the tailgate opening of the motor vehicle and a fourth end adjacent the rear seat and the beltline of the motor vehicle. In one possible embodiment, the first mounting element and the second mounting element are both substantially S-shaped channels.

In one possible embodiment, the partition includes at least one support rod, having two opposed ends to receive and hold the retractable mounting pins. Further, a plurality of locking apertures are provided in communication with the first mounting element and the second mounting element. The retractable pins are displaceable into a locked position wherein the retractable mounting pins extend through the first mounting element and the second mounting element into the plurality of locking apertures to lock the partition into at least one set position.

In one possible embodiment, the at least one support rod includes an actuator mechanically connected to the retractable mounting pins whereby the retractable mounting pins might be selectively displaced between a retracted position, the extended position and the locked position by manipulating the actuator.

In one possible embodiment, the partition includes a plurality of folding panels. More specifically, the partition may include a first panel, a second panel and a third panel. A first support rod may be provided at a first end of the first panel. A second support rod may be provided connecting the first panel to the second panel. A third support rod may be provided connecting the second panel to the third panel and a fourth support rod may be provided at a second end of the third panel.

In one possible embodiment, the first section, the second section and the third section of the first mounting element are parallel and are separated by a distance $D_1$ and the four support rods are parallel and are separated by a distance $D_2$, where $D_1 = D_2$.

In accordance with an additional aspect, a cargo management system is provided for a cargo area of a motor vehicle. That cargo management system comprises a first S-shaped mounting element on a first sidewall of the cargo area, a second S-shaped mounting element on a second side wall of the cargo area and a partition extending between the first and second S-shaped mounting elements. That partition is configurable into multiple operating positions.

In one possible embodiment, this partition includes a plurality of folding panels. Further, the first S-shaped mounting element has a first end adjacent a floor and a tailgate opening of the motor vehicle and a second end adjacent a rear seat and a beltline of the motor vehicle. Similarly, the second S-shaped mounting element has a third end adjacent the floor and the tailgate opening of the motor vehicle and a fourth end adjacent the rear seat and the beltline of the motor vehicle. Advantageously, the plurality of folding panels may be configured flat, in an L-shape or a U-shape, and still be secured in the first S-shaped mounting element and the second S-shaped mounting element.

In accordance with yet another aspect, a method of managing cargo in a cargo area of a motor vehicle is provided. That method may be broadly described as comprising the steps of extending a partition across the cargo area between two, opposing S-shaped partition mounting elements. Further, the method includes folding the partition into a desired configuration for holding cargo in the car.

In the following description, there are shown and described several preferred embodiments of the cargo management system. As it should be realized, the cargo management system is capable of other, different embodiments and its several details are capable of modification in various, obvious aspects all without departing from the cargo management system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo management system and together with the description serve to explain certain principles thereof. In the drawing figures.

Figure 14A:
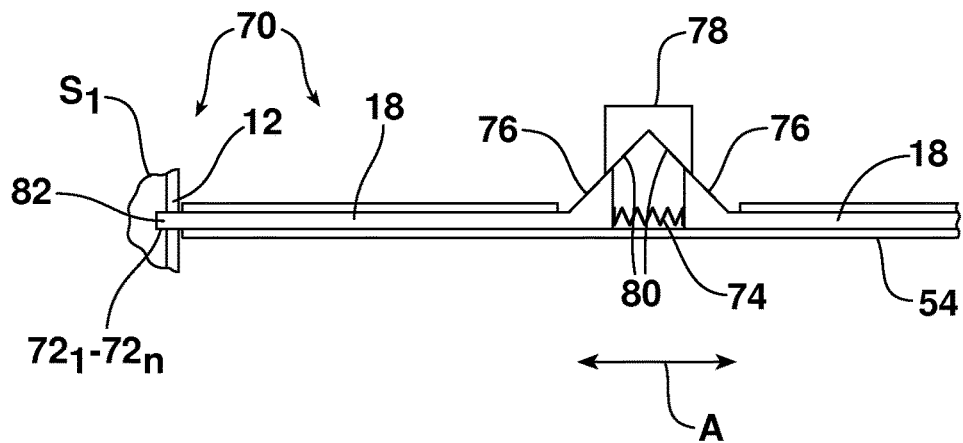
Figure 14B:
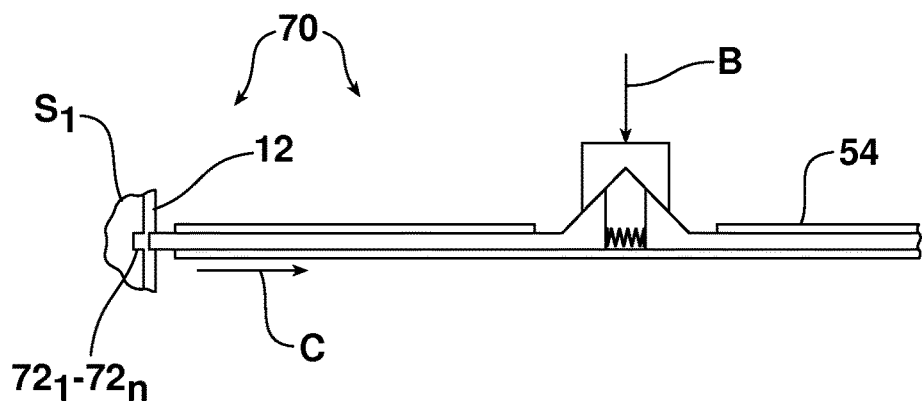
Figure 14C:
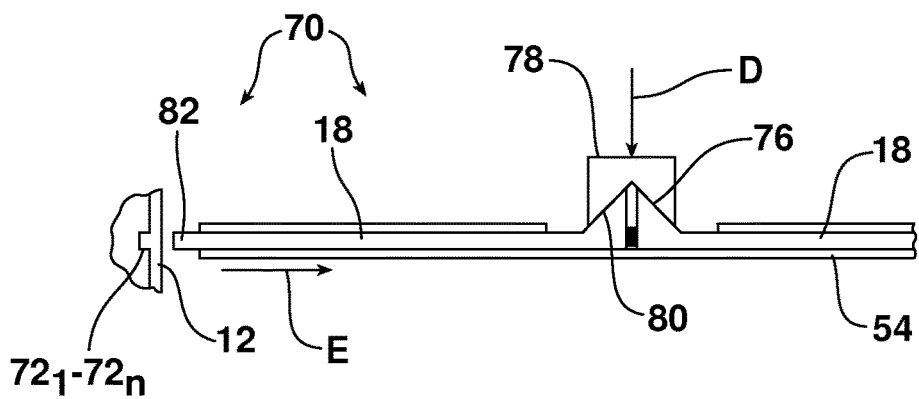

FIGS. 14a-14c are schematic illustrations of the opposed retractable mounting pins and the actuator utilized to lock the partition of the cargo management system in the configurations shown in FIGS. 1-11. FIG. 14a illustrates the retractable locking pins in the locked position. FIG. 14b illustrates the retractable mounting pins in the extended or intermediate position. FIG. 14c illustrates the retractable locking pins in the fully retracted position.

Reference will now be made in detail to the present preferred embodiments of the cargo management system, examples of which are illustrated in the accompanying drawing figures.

DETAILED DESCRIPTION

Reference is now made to FIGS. 1-11 illustrating the cargo management system 10 that is the subject matter of this document. As should be appreciated from the following description, the cargo management system 10 is a user-friendly and uniquely versatile way to manage cargo in the cargo area A of a motor vehicle such as behind the rear seats of an SUV as shown.

As illustrated, the cargo management system 10 includes a first mounting element 12 on a first side wall Si of the cargo area A. A second mounting element 14 is provided on a second side wall of the cargo area A directly opposite the first mounting element 12 and first sidewall Si. For clarity of illustration, the second mounting element 14 is illustrated in phantom line and the second sidewall is not shown. As should be appreciated, the second mounting element 14 is a mirror image of the first mounting element 12. A partition 16 extends between the first and second mounting elements 12, 14. The partition 16 includes a plurality of mounting pins 18 that engage in the first and second mounting elements 12, 14. As will be described in greater detail below, at least two of the mounting pins 18 are retractable and displaceable between a fully extended or locked position as illustrated in FIG. 14a, an intermediate extended position as illustrated in FIG. 14b and a fully retracted position as illustrated in FIG. 14c.

As illustrated in FIGS. 1-11 and 12, the first mounting element 12 includes a first section 20, a second section 22 positioned vertically above the first section and a third section 24 positioned vertically above the second section. In the illustrated embodiment, the first, second and third sections 20, 22, 24 are all parallel and extend in a substantially horizontal plane. A first curve 26 connects the first and second sections 20, 22 while a second curve 28 connects the second and third sections 22, 24.

Similar to the first mounting element 12, the second mounting element 14 includes fourth, fifth and sixth sections 28, 30, 32, a third curve 34 connecting the fourth and fifth sections 28, 30 and a fourth curve 36 connecting the fifth and sixth sections 30, 32. As should be appreciated, the first section 20 is horizontally aligned with the fourth section 28. The second section 22 is horizontally aligned with the fifth section 30. The third section 24 is horizontally aligned with the sixth section 32. Further, the first and third curves 26, 34 are open in a vehicle rearward direction while the second and fourth curves 28, 36 are open in a vehicle forward direction.

Figure 12:
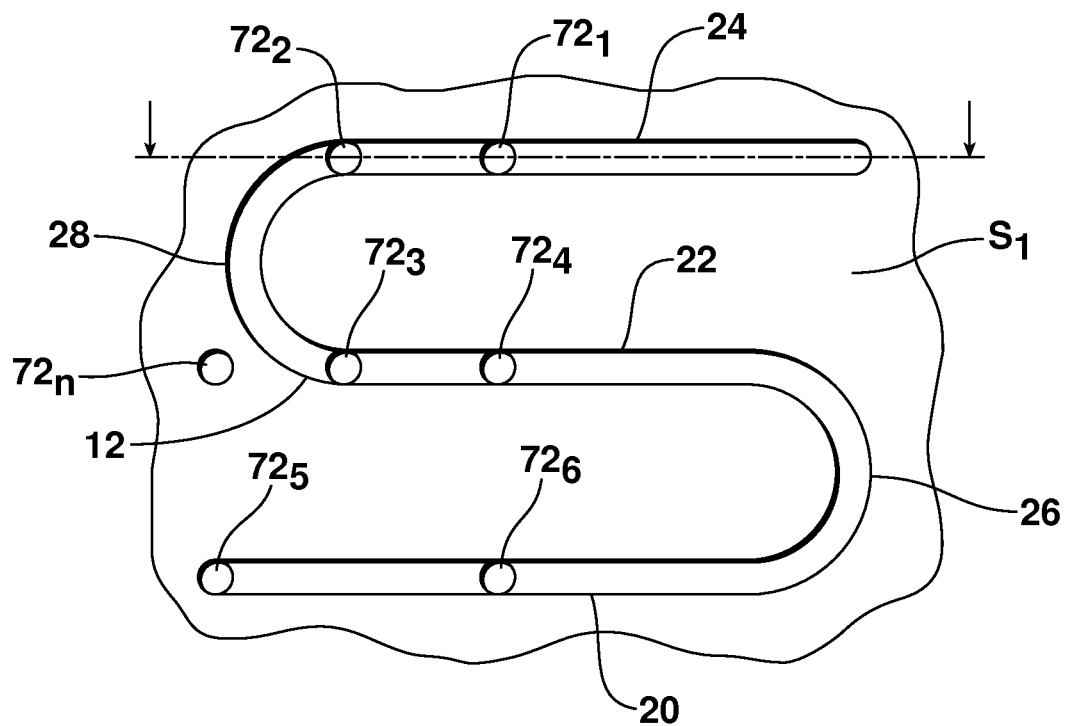
FIG. 12 is a detailed front elevational view of the first mounting element or S-shaped channel of the cargo management system.

As should be clear from viewing FIG. 12, the first section 20, the second section 22, the third section 24, the first curve 26 and the second curve 28 form a continuous first mounting element 12 having a first end 40 adjacent a floor F and a tailgate opening T of the motor vehicle and a second end 42 adjacent the rear seat R and a beltline B of the motor vehicle. Similarly, the fourth section 30, the fifth section 32, the sixth section 34, the third curve 36 and the fourth curve 38 form a continuous second mounting element 14 having a third end 44 adjacent the floor F and the tailgate opening T of the motor vehicle and a fourth end 46 adjacent the rear seat R and the beltline B of the motor vehicle. In one particularly useful embodiment, the first mounting element 12 and the second mounting elements 14 are both substantially S-shaped channels.

As illustrated in FIGS. 1-11, the partition 16 includes a plurality of folding panels. More specifically, in the illustrated embodiment, the partition 16 includes a first panel 48, a second panel 50 and a third panel 52. A first support rod 54 is provided at a first end of the first panel 48. A second support rod 56 functions as a hinge connecting the first panel 48 to the second panel 50. A third support rod 58 functions as a hinge connecting the opposite end of the second panel 50 to the third panel 52. A fourth support rod 60 is provided at the second end of the third panel 52. In order to provide for versatility and the potential for assuming a number of configurations, the first section 20, the second section 22 and the third section 24 of the first mounting element 12, and the fourth section 30, the fifth section 32 and the sixth section 34 of the second mounting element 14 are all parallel and separated by a distance $D_1$ while the first support rod 54, the second support rod 56, the third support rod 58 and the fourth support rod 60 are also all parallel and separated by a distance $D_2$ where $D_1=D_2$. As a consequence of this construction, the partition 16 may assume multiple configurations including, for example, the one illustrated in FIG. 1 wherein the first and second panels 48, 50 are held substantially flat along the floor F while the third panel 52 is tilted upwardly from the floor F toward the rear seat R.

Figure 1:
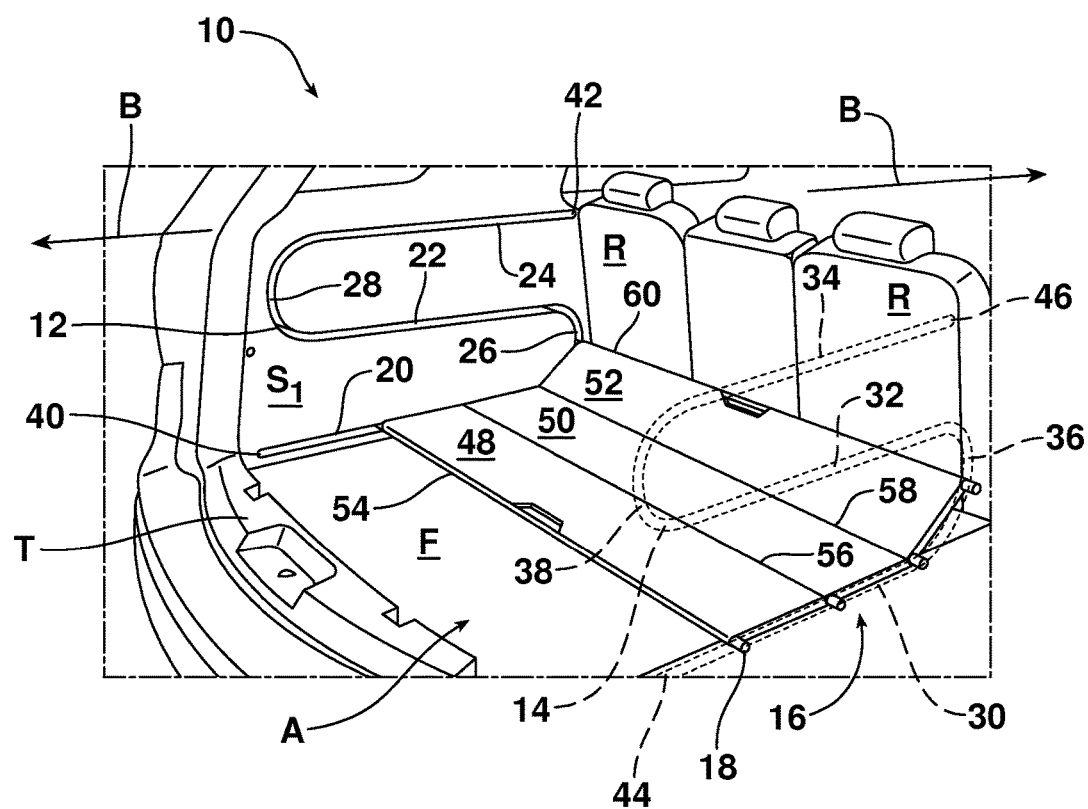
FIGS. 1-11 are perspective views illustrating the cargo management system with the partition of that system in eleven different configurations so as to demonstrate the versatility of the cargo management system.
Figure 2:
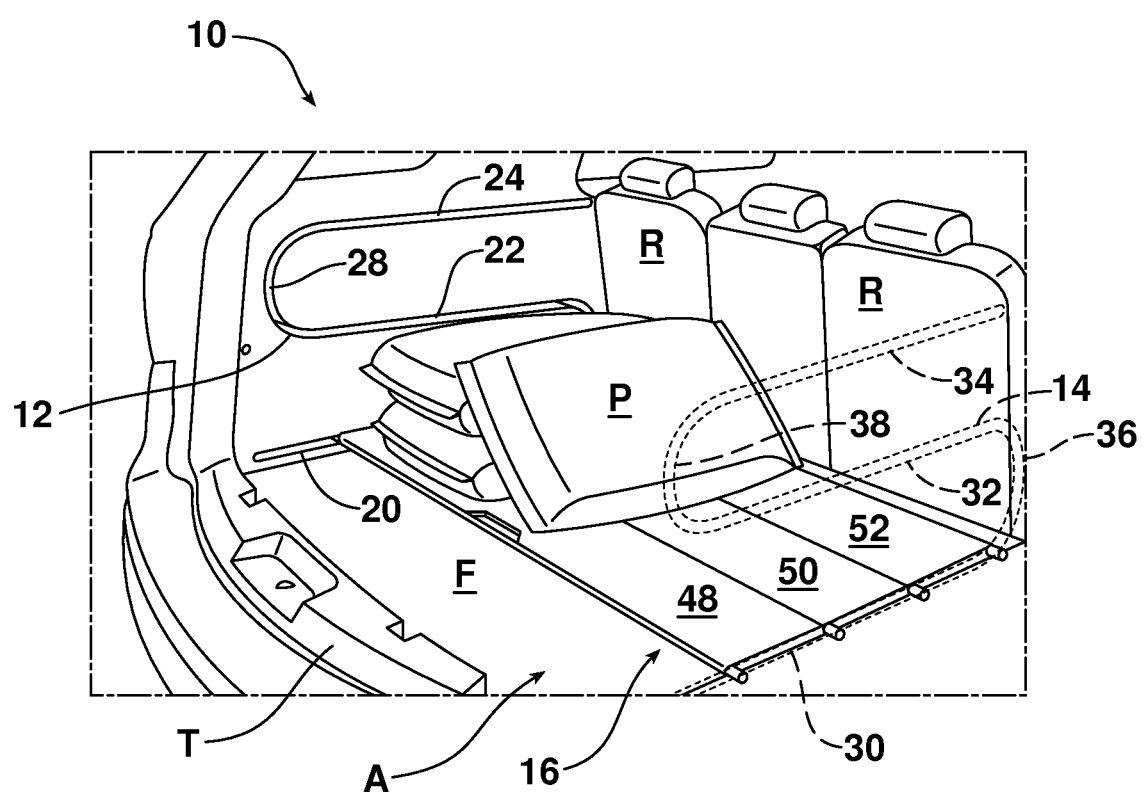

In contrast, in the configuration illustrated in FIG. 2, the partition 16, including all three panels 48, 50, 52 are flat along the floor F. As illustrated, packages P may be placed upon the partition 16 if desired as the panels 48, 50, 52 of the partition are sufficiently rigid to function as a shelf.

Figure 3:
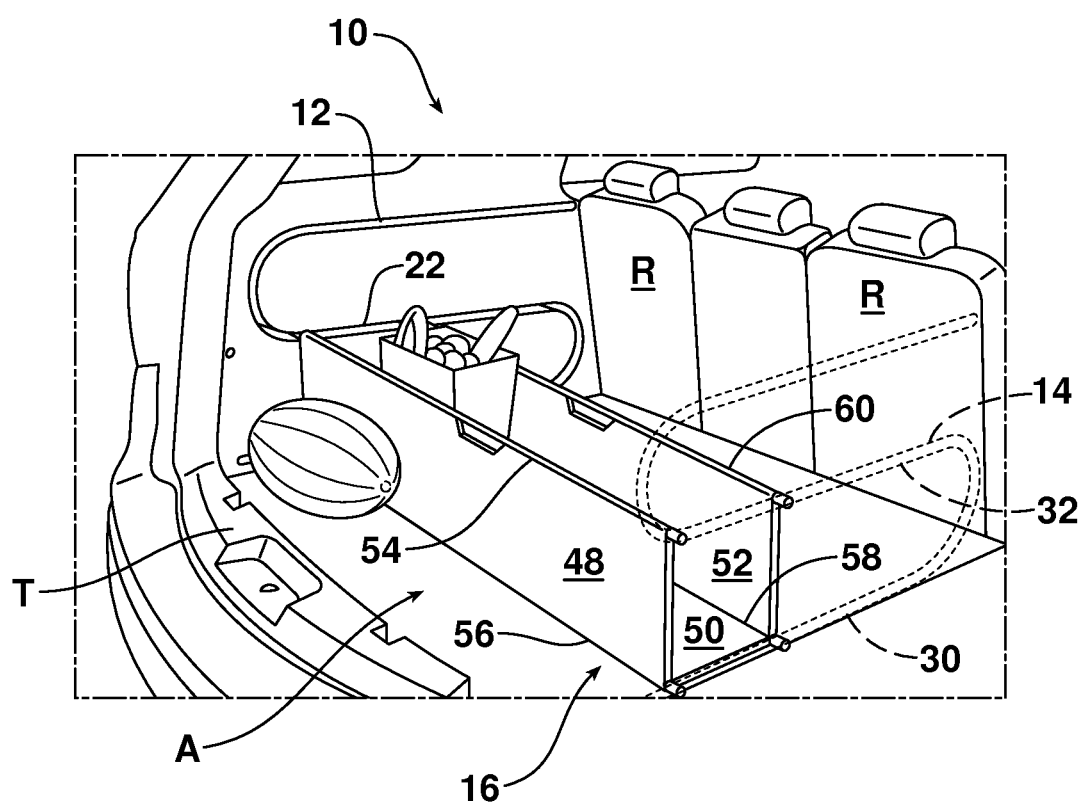

In the embodiment illustrated in FIG. 3, the partition 16 is configured in a U-shape to divide the cargo area A into three sections.

Figure 4:
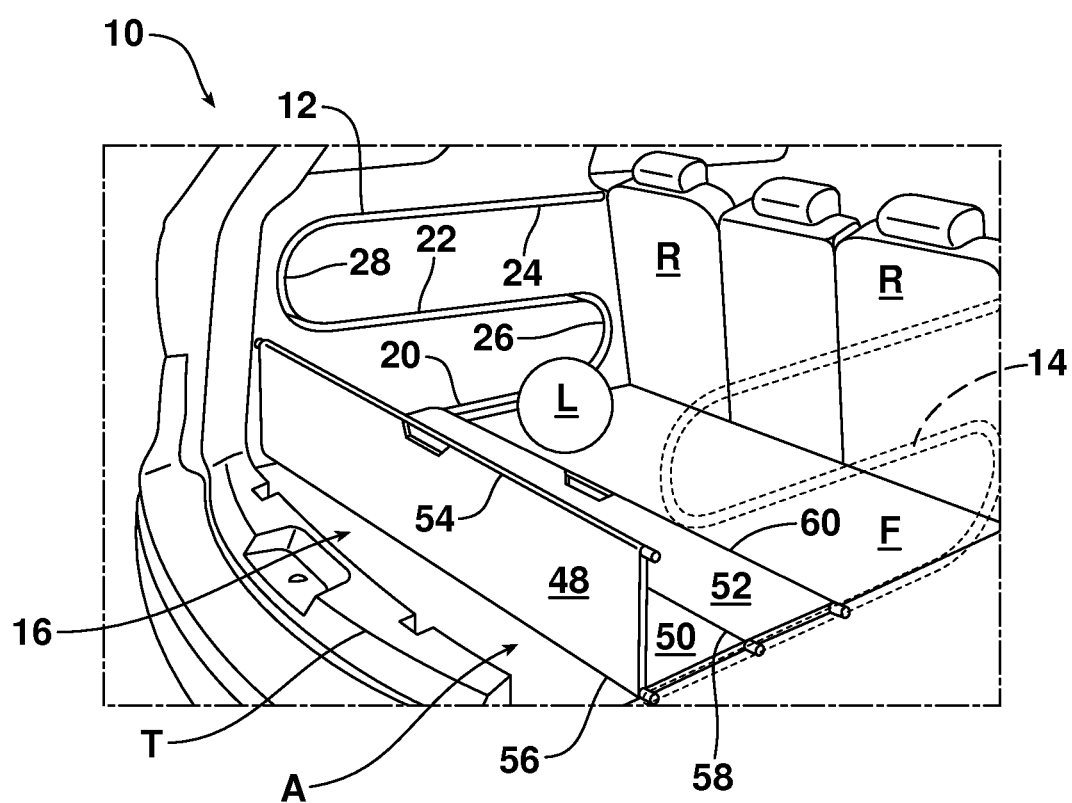

In the configuration illustrated in FIG. 4, the partition 16 is provided as an L-shape with the first panel 48 substantially upright to block the lower portion of the tailgate opening T while the second and third panels 50, 52 are flat along the floor F. This prevents articles such as the ball B illustrated in the figure from rolling out of the tailgate opening T when the tailgate is opened and the motor vehicle is positioned on an upward incline.

Figure 5:
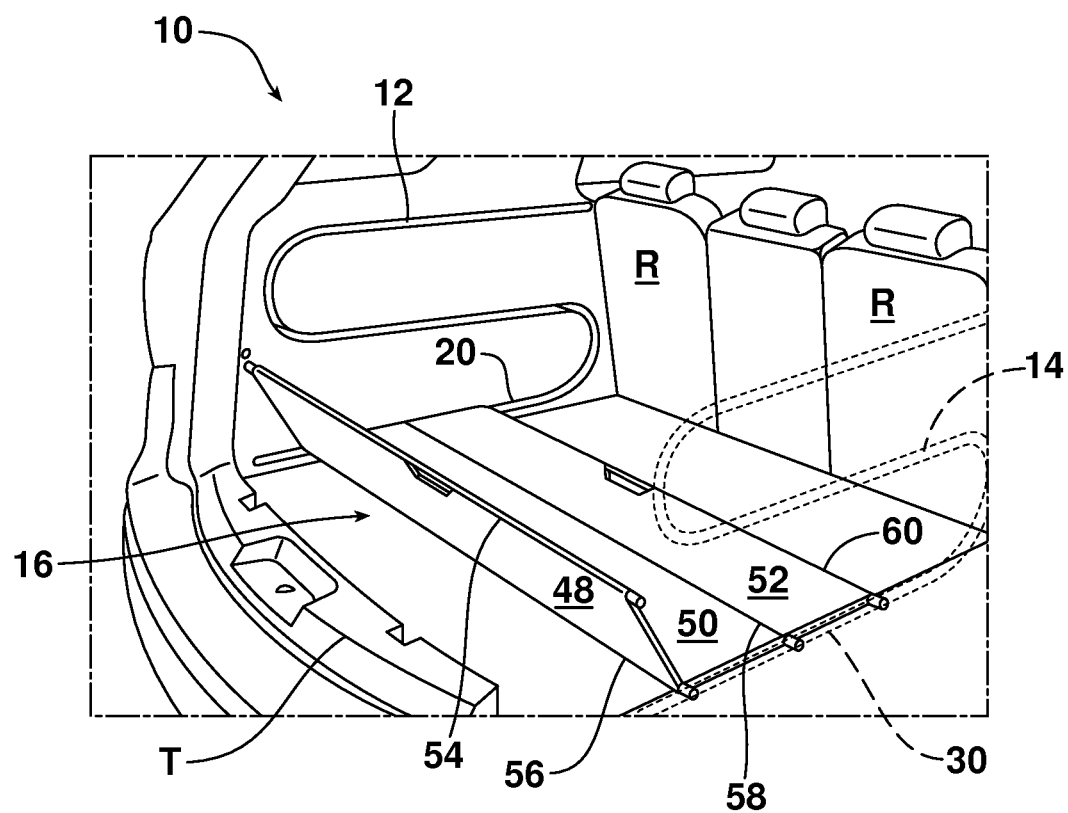

In contrast, in the configuration illustrated in FIG. 5, the partition 16 includes a first panel 48 in an inclined rather than a vertical position.

Figure 6:
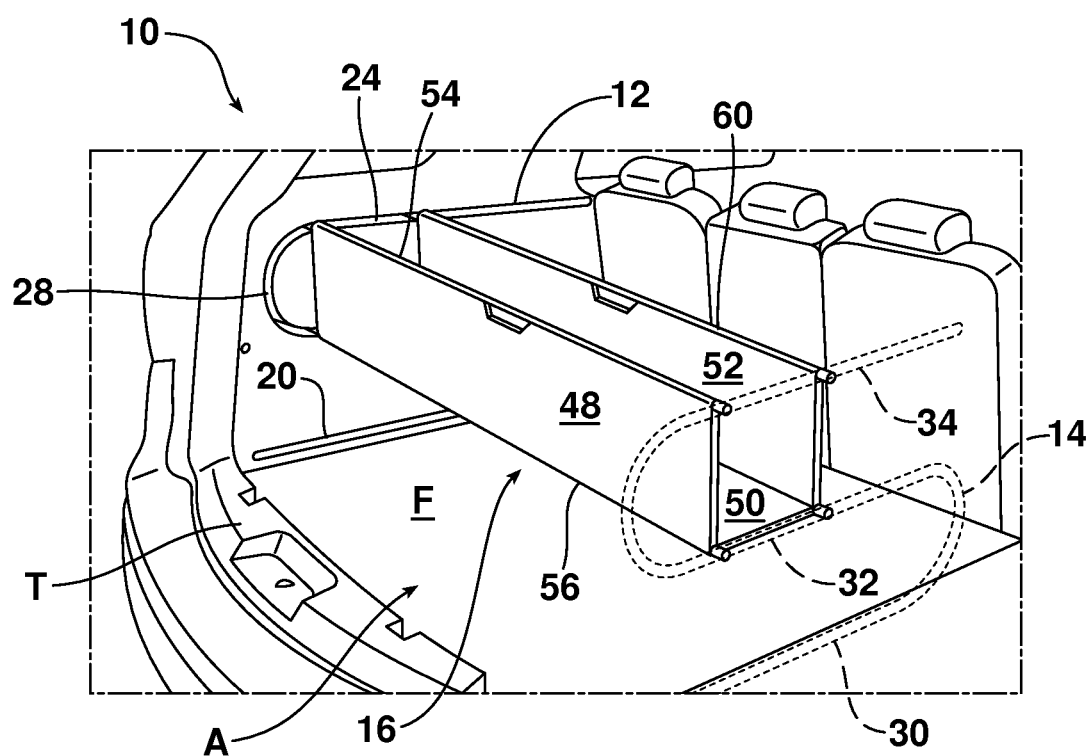

In the configuration illustrated in FIG. 6, the partition 16 is again in a substantially U-shape. However, it should be appreciated that the partition 16 is positioned above the floor with the ends of the first and fourth support rods 54, 60 supported in the third and fourth sections 24, 30 and the ends of the second and third support rods 56, 58 supported in the second and fifth sections 22, 32.

Figure 7:
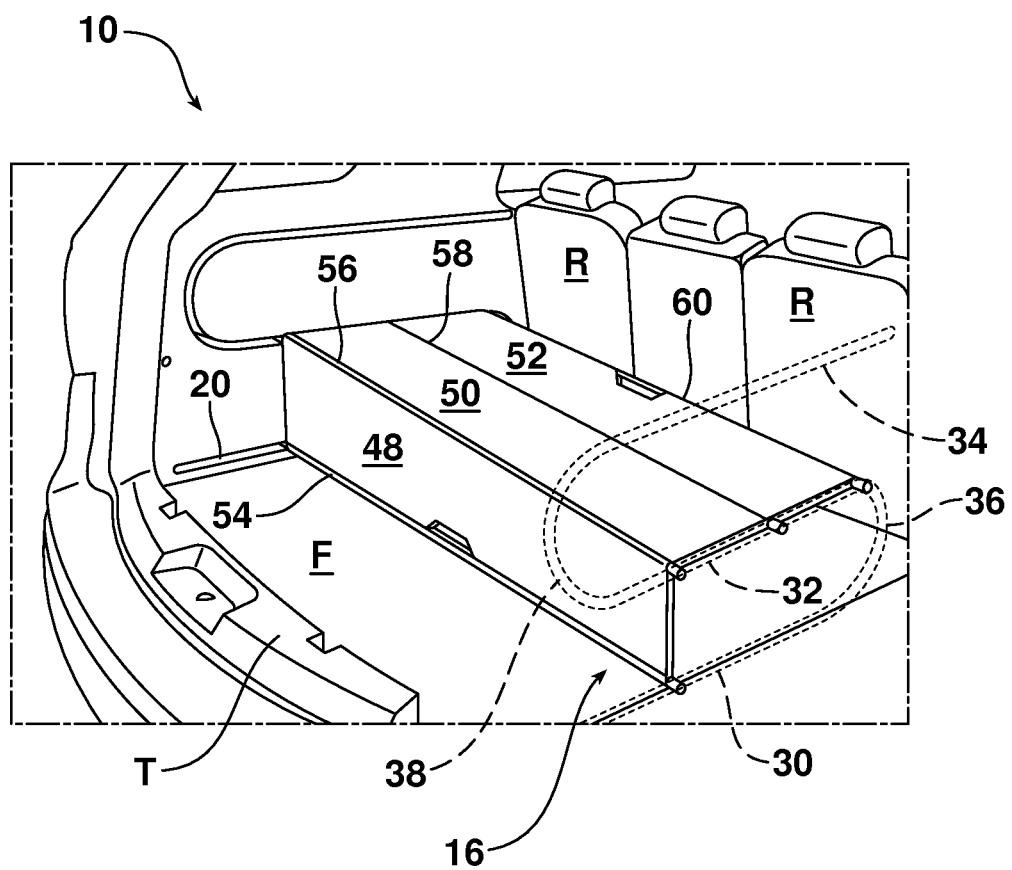

FIG. 7 illustrates another L-shaped configuration wherein the partition 16 includes a first panel 48 directed vertically downwardly and the second and third panels 50, 52 directed horizontally or flat while being supported by the second and fifth sections 22, 32 of the first and second mounting elements 12, 14.

Figure 8:
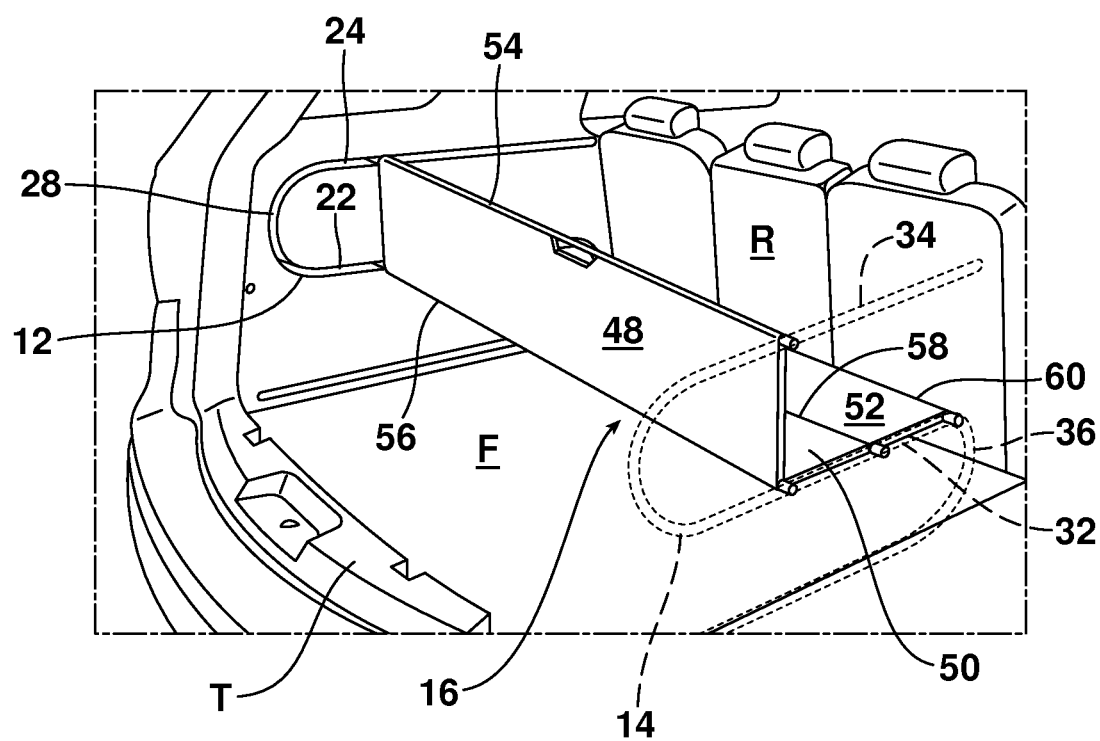

FIG. 8 illustrates yet another L-shaped configuration wherein the first panel 48 is oriented vertically upward with the first support rod 54 supported in the third and sixth sections 24, 34 and the second and third panels 50, 52 extending horizontally and supported in the second and fifth sections 22, 32 of the first and second mounting elements 12, 14.

Figure 9:
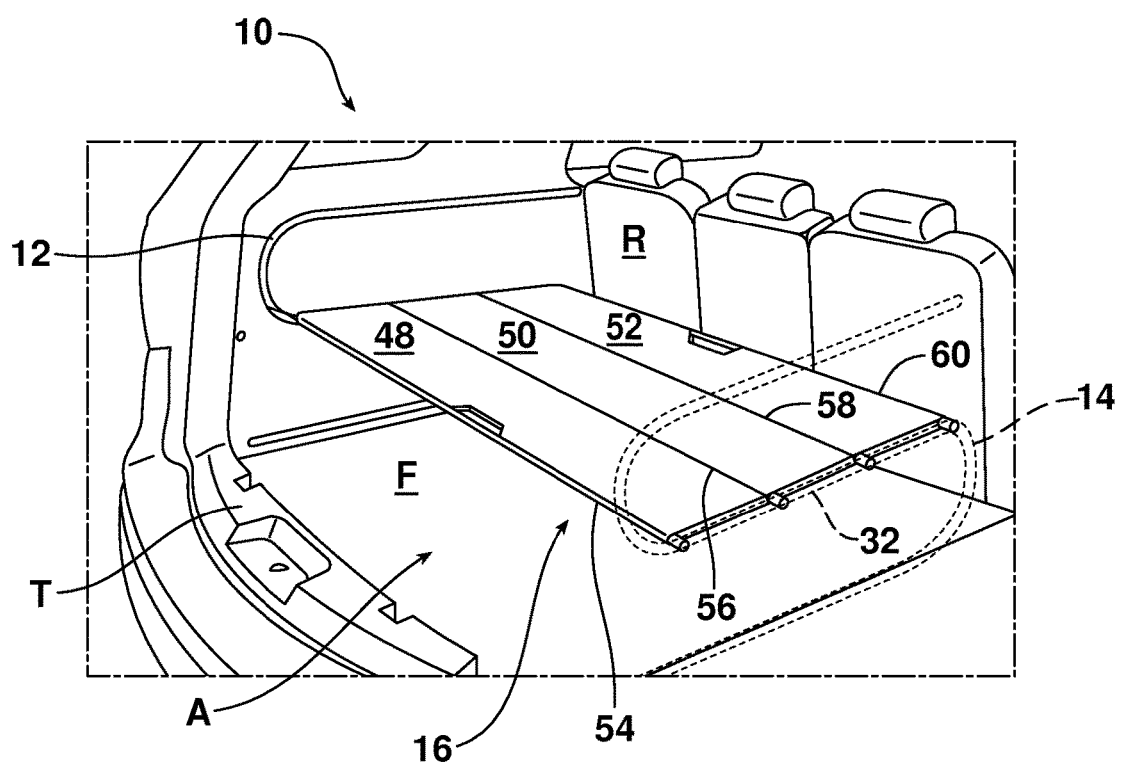

FIG. 9 illustrates another all flat configuration wherein all three panels 48, 50, 52 of the partition 16 are supported horizontally by the second and fifth sections 22, 32 of the first and second elements 12, 14. This configuration divides the cargo area A into upper and lower sections with the partition 16 functioning as a shelf.

Figure 10:
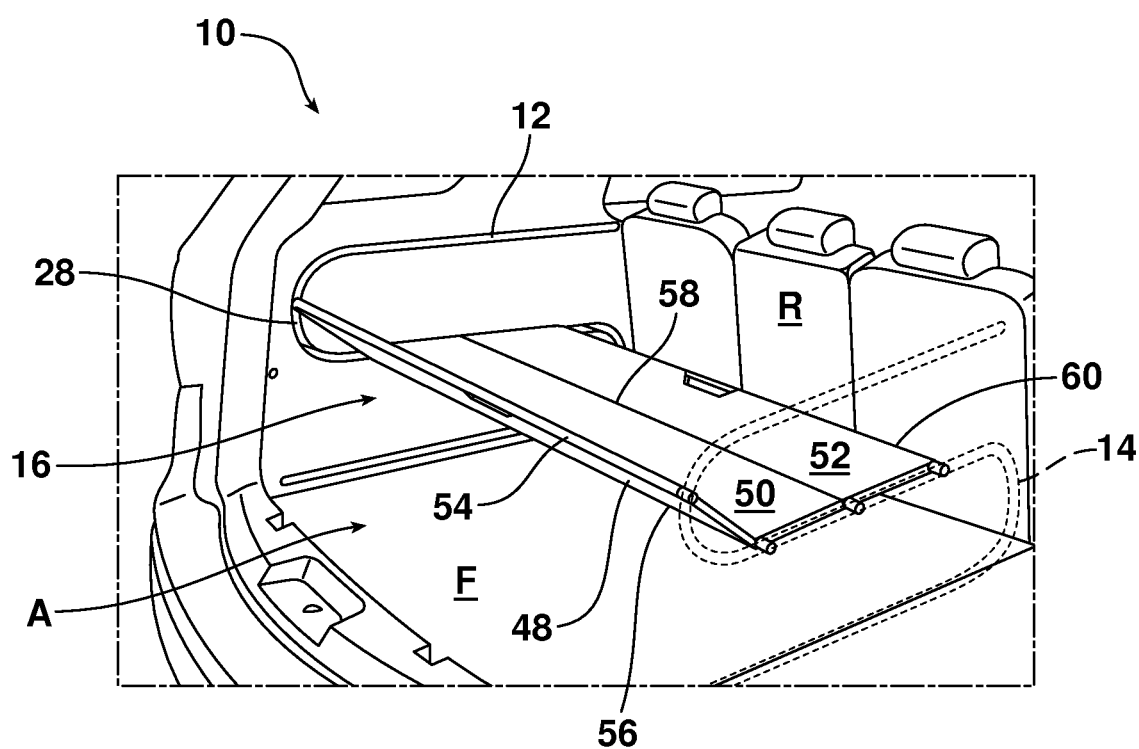

FIG. 10 illustrates a configuration wherein the partition 16 includes the first panel 48 in an inclined position and the second and third panels 50, 52 supported in a horizontal position, supported above the floor F by the second and fifth sections 22, 32 of the first and second mounting elements 12, 14.

Figure 11:
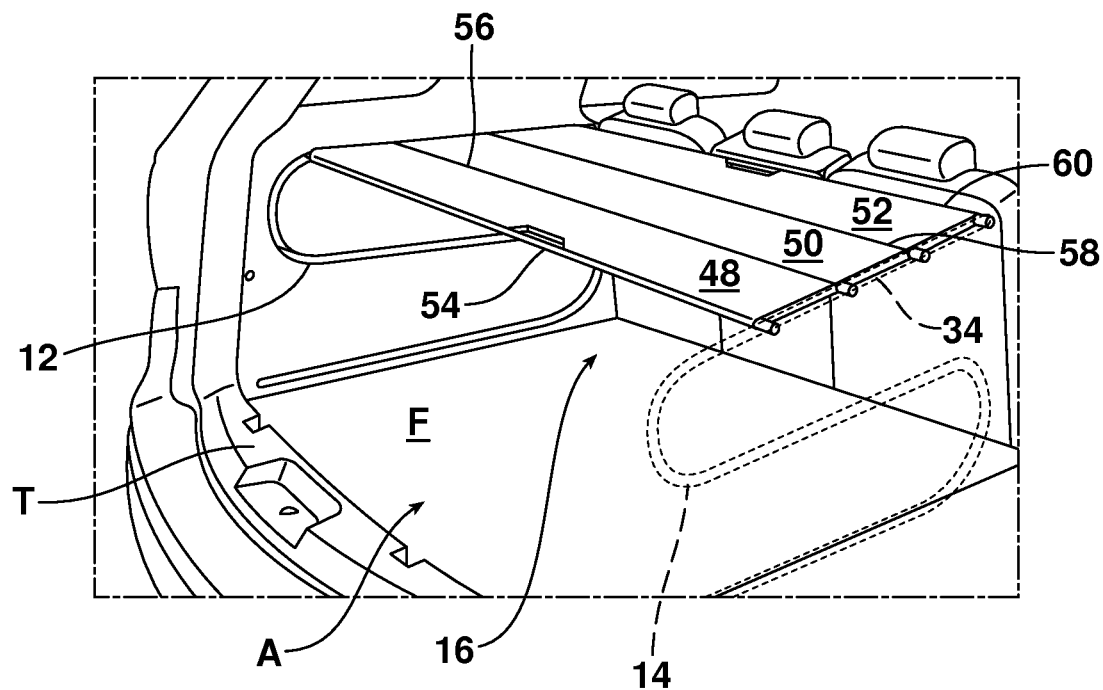

In FIG. 11, the entire partition 16 is supported in a flat configuration by the uppermost sections 24, 34 of the first and second mounting elements 12, 14 so as to provide a view block of the cargo area A between the tailgate opening T and the rear seat RR. This allows one to conceal from view any cargo on the floor F of the cargo area A.

Figure 13:
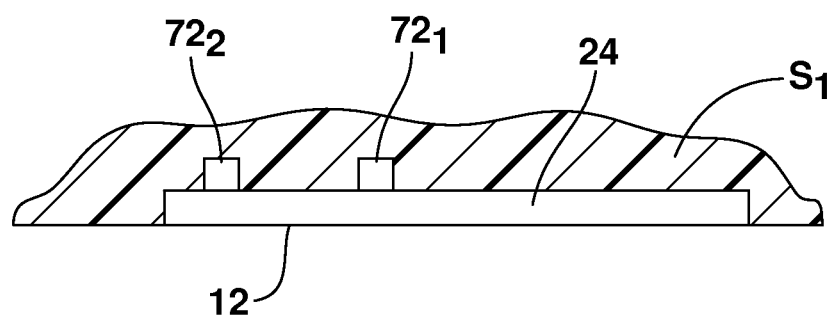
FIG. 13 is a cross-sectional view of the third section of the first mounting element taken along the section line in FIG. 12 and illustrating two locking apertures in communication with the first mounting element.

Reference is now made to FIGS. 12, 13 and 14a-14c which illustrate one possible locking mechanism 70 for securing the partition 16 in the various configurations illustrated in FIGS. 1-11. As best illustrated in FIGS. 12 and 13, the cargo management system 10 includes a plurality of locking apertures $72_1$-$72_n$ in communication with both the first mounting element 12 and the second mounting element 14. In the illustrated embodiment, the locking apertures $72_1$ and $72_2$ are provided in communication with the upper, third section 24 of the first mounting element 12, the locking apertures $72_3$ and $72_4$ are provided in communication with the middle or second section 22 of the first mounting element, while locking apertures $72_5$ and $72_6$ are provided in communication with the first or lowermost section 20 of the first mounting element 12. An additional locking aperture $72_n$ is provided outside the first mounting element 12, where it is substantially aligned with the locking apertures $72_3$ and $72_4$. Matching or opposed locking elements (not shown) are provided in communication with the second mounting element 14 directly across from the first mounting element 12.

As is illustrated in FIGS. 14a-14c, the first support rod 54 includes opposed mounting pins 18 that are biased outwardly in the direction of action arrow A by means of a spring 74. As illustrated, the innermost ends of the mounting pins 18 include cams 76. An actuator 78 includes a cooperating cam face 80 engaging the cams 76. When the retractable mounting pins 18 are in the locked position illustrated in FIG. 14a, the projecting mounting pins 18 include distal ends 82 that extend through the opposed first and second mounting elements 12, 14 into the locking apertures $72_1$-$72_n$ with which they are aligned at any given time. In this way, it is possible to lock the partition 16 into any of the desired positions by using any of the various locking apertures $72_1$-$72_n$.

When it is desired to release the partition 16 from one of the locked positions, one depresses the actuator 78 which may, for example, be provided on the handle 84 (see FIGS. 1-11). When the actuator 84 is depressed to an intermediate position, the cam surface 80 slides along the cams 76 at the inner ends of the mounting pins 18, drawing those pins inwardly (note action arrow C in FIG. 14b) against the force of the biasing spring 74 until the distal ends 82 of the pins 18 are fully withdrawn from the locking apertures $72_1$-$72_n$ and only engaged and held in the first and second mounting elements 12, 14. When this is done, one may slide the partition 16 along the S-shaped channels that make up the first and second mounting elements 12, 14 until the partition is displaced into a desired configuration. At that time, the actuator 78 may be released so that the spring 74 may again bias the mounting pins 18 outwardly as illustrated in FIG. 14a into the aligned locking apertures $72_1$-$72_n$ provided/located for locking the partition 16 into the desired, new configuration.

In order to assume certain of the configurations illustrated in FIGS. 1-11 including, for example, the configuration illustrated in FIG. 5, it is necessary to temporarily remove the distal ends 82 of the mounting pins 18 from both the locking apertures $72_1$-$72_n$ and the channels of the first and second mounting elements 12, 14. In order to do this, one fully depresses the actuator 78 as illustrated in FIG. 14c (note action arrow D). When the actuator 78 is fully depressed, the mounting pins 18 are drawn together as illustrated by action arrow E to their fullest extent against the forces of the biasing spring 74. This results in the distal ends 82 of the pins 18 being withdrawn from both the locking apertures $72_1$-$72_n$ and the channels of the first and second mounting elements 12, 14. When this is done, the first panel 48 may be pivoted about the second support rod 56 into substantially any configuration necessary to again align the mounting pins 18 of the first support rod 54 with the first and second mounting elements 12, 14 or even the independent locking apertures $72_n$ as desired. Upon releasing the actuator 78, the spring 74 again biases the pins 18 outwardly as illustrated in FIG. 14a until they again engage in any aligned locking apertures $72_1$-$72_n$ provided to secure the partition 16 in a desired configuration.

In summary, the cargo management system 10 is characterized by a number of benefits and advantages including but not limited to having a simple and inexpensive construction that is very easy to use. Advantageously, the cargo management system 10 may be easily oriented into a number of different configurations suitable for substantially any foreseeable application. Depending upon the cargo being transported, one configuration may be far more effective in preventing rattling and maintaining cargo in a desired position in the cargo area than another. This is particularly true during spirited operation of a motor vehicle.

The foregoing has been presented for purposes of illustration and description. It is not intended to be exhaustive or to limit the embodiments to the precise form disclosed. Obvious modifications and variations are possible in light of the above teachings. For example, the illustrated locking mechanism 70 includes a pushbutton actuator 78. It could just as easily include an actuator that is twisted to retract and extend the proposed mounting pins 18. Further, while the illustrated embodiment includes a single set of retractable mounting pins 18 in the first support rod 54, it should be appreciated that one or more of the other support rods 56, 58, 60 could also be equipped with retractable mounting pins if desired. In still another embodiment, all four support rods 54, 56, 58, 60 could include static pins if desired for any particular vehicle application. All such modifications and variations are within the scope of the appended claims when interpreted in accordance with the breadth to which they are fairly, legally and equitably entitled.

What is claimed:

1. A cargo management system for a cargo area of a motor vehicle, comprising:
   a first mounting element on a first sidewall of the cargo area;
   a second mounting element on a second sidewall of the cargo area;
   a partition including a plurality of retractable mounting pins displaceable between a retracted position for removing said partition from said first mounting element and said second mounting element and an extended position for engaging said partition with said first mounting element and said second mounting element, said partition further including at least one support rod having two opposed ends that receive and hold said plurality of retractable mounting pins; and
   a plurality of locking apertures in communication with said first mounting element and said second mounting element, said retractable mounting pins also being displaceable into a locked position wherein said retractable mounting pins extend through said first mounting element and said second mounting element into said plurality of locking apertures to lock said partition into at least one selected position.

2. The cargo management system of claim 1 wherein,
   (a) said first mounting element includes a first section, a second section and a third section, said second section being positioned vertically above said first section and said third section being positioned vertically above said second section; and
   (b) said second mounting element includes a fourth section, a fifth section and a sixth section, said fifth section being positioned vertically above said fourth section and said sixth section being positioned vertically above said fifth section.

3. The cargo management system of claim 2, wherein said first section is aligned with said fourth section, said second section is aligned with said fifth section and said third section is aligned with said sixth section.

4. The cargo management system of claim 3, further including a first curve connecting said first section and said second section, a second curve connecting said second section and said third section, a third curve connecting said fourth section and said fifth section and a fourth curve connecting said fifth section and said sixth section.

5. The cargo management system of claim 4, wherein said first curve and said third curve are open in a vehicle rearward direction and said second curve and said fourth curve are open in a vehicle forward direction.

6. The cargo management system of claim 5, wherein
   (a) said first section, said second section, said third section, said first curve and said second curve form a continuous first mounting element having a first end adjacent a floor and a tailgate opening of the motor vehicle and a second end adjacent a rear seat and a beltline of said motor vehicle; and
   (b) said fourth section, said fifth section, said sixth section, said third curve and said fourth curve form a continuous second mounting element having a third end adjacent the floor and the tailgate opening of the motor vehicle and a fourth end adjacent the rear seat and the beltline of the motor vehicle.

7. The cargo management system of claim 1, wherein said first mounting element and said second mounting element are both substantially S-shaped channels.

8. The cargo management system of claim 1, wherein said at least one support rod includes an actuator mechanically connected to said retractable mounting pins whereby said retractable mounting pins may be selectively displaced between said retracted position, said extended position and said locked position by manipulating said actuator.

9. The cargo management system of claim 8, wherein said partition includes a plurality of folding panels.

10. The cargo management system of claim 8, wherein said partition includes a first panel, a second panel and a third panel, a first support rod at a first end of said first panel, a second support rod connecting said first panel to said second panel, a third support rod connecting said second panel to said third panel and a fourth support rod at a second end of said third panel.

11. The cargo management system of claim 10, wherein said first section, said second section and said third section are parallel and separated by a distance $D_1$ and said first support rod, said second support rod, said third support rod and said fourth support rod are parallel and separated by a distance $D_2$ where $D_1=D_2$.

12. A cargo management system for a cargo area of a motor vehicle, comprising:
   a first S-shaped mounting element on a first sidewall of the cargo area, wherein said first S-shaped mounting element has a first end adjacent a floor and a tailgate of the motor vehicle and a second end adjacent a rear seat and a beltline of the motor vehicle;
   a second S-shaped mounting element on a second sidewall of the cargo area; and
   a partition extending between said first S-shaped mounting element and said second S-shaped mounting element, said partition being configurable into multiple operating positions.

13. The cargo management system of claim 12 wherein said partition includes a plurality of folding panels.

14. The cargo management system of claim 13, wherein said second S-shaped mounting element has a third end adjacent the floor and the tailgate of the motor vehicle and a fourth end adjacent the rear seat and the beltline of the motor vehicle.

15. The cargo management system of claim 13, wherein said plurality of folding panels may be configured flat, in an L-shape or in a U-shape and still be secured in said first S-shaped mounting element and said second S-shaped mounting element.

* * * * *